(12) United States Patent
Lorie

(10) Patent No.: US 6,691,309 B1
(45) Date of Patent: Feb. 10, 2004

(54) LONG TERM ARCHIVING OF DIGITAL INFORMATION

(75) Inventor: Raymond Amand Lorie, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/513,345

(22) Filed: Feb. 25, 2000

(51) Int. Cl.$^7$ .............................. G06F 9/445; G06F 9/45
(52) U.S. Cl. ........................ 717/175; 717/147; 715/522
(58) Field of Search ................................ 717/175, 147; 707/101, 203, 204, 205, 103 R; 709/201; 713/2; 715/522; 345/835; 358/404

(56) References Cited

U.S. PATENT DOCUMENTS

| | | | | |
|---|---|---|---|---|
| 5,274,807 A | * | 12/1993 | Hoshen et al. .............. | 707/205 |
| 5,276,867 A | * | 1/1994 | Kenley et al. .............. | 707/204 |
| 5,278,978 A | * | 1/1994 | Demers et al. ............. | 707/101 |
| 5,339,419 A | * | 8/1994 | Chan et al. ................. | 717/147 |

(List continued on next page.)

FOREIGN PATENT DOCUMENTS

DE    19613666    *  4/1996    ........... G05B/15/00

OTHER PUBLICATIONS

Winzip, Nico Mak Computing INC, version 6.0A, 1995, pp. 1–106 of screen prints of products abilities.*
IBM Research Report, "Long Term Archiving of Digital Information", R.A. Lorie, May 18, 2000, pp. 1–16.*
"Long Term Preservation of Digital Information", R.A. Lorie, ACM, pp. 346–352, 2001.*
"A Methodology and Systen for Preserving Digital Data", R.A. Lorie, ACM pp. 312–319, 2002.*

"Ensuring the Longevity of Digital Information", Jeff Rothenberg, RAND, 1700 Main Street, Santa Monica, CA 90407, http://www.clir.org/pubs/archives/ensuring.pdf Feb. 22, 1999.

"Avoiding Technological Quicksand: Finding a Viable Technical Foundation for Digital Preservation", A Report to the Council on Library and Information Resources, Jeff Rothenberg, Jan. 1999, ISBN 1–887334–63–7, http://www.clir.org/pubs/reports/rothenberg/pub77.pdf.

*Primary Examiner*—Todd Ingberg
(74) *Attorney, Agent, or Firm*—Lacasse & Associates, LLC; Randy W. Lacasse; Khanh Q. Tran, Esq.

(57) ABSTRACT

Digital data is preserved by archiving on a removable medium. In the long term, the save data bit stream must be correctly interpreted. For a computer program or system to be archived, the bit stream constituting the program must be archived and the code must be executable at restore time. The program that restores the data does not "see" the contents of the data itself, but accesses it by issuing a function call to an executor. A description of which methods are available to restore the information hidden in the data is always available. A text tells the client which functions are available and what their purposes are. The archiving method is based on using a virtual computer instruction set and saving the algorithm as a program written int hat virtual machine language. For machine instructions to be executed many years later, for example 100 years, an emulator of the original machine would be written on the future hardware. Any machine manufactured in the originating year would develop for each architecture a Universal Virtual Computer (UVC) description of the machine. Each originating instruction would be mapped into a small program of UVC instructions. All manufacturers of new architectures would then have to write a UVC executor which would be able to execute UVC instructions on the machine running 100 years in the future.

48 Claims, 10 Drawing Sheets

U.S. PATENT DOCUMENTS

| | | | | |
|---|---|---|---|---|
| 5,402,474 A | * | 3/1995 | Miller et al. | 379/93.12 |
| 5,416,917 A | * | 5/1995 | Adair et al. | 707/203 |
| 5,519,869 A | * | 5/1996 | Payne et al. | 713/2 |
| 5,701,183 A | * | 12/1997 | Bellemare et al. | 358/404 |
| 5,706,457 A | * | 1/1998 | Dwyer et al. | 345/835 |
| 5,875,478 A | * | 2/1999 | Blumenau | 711/162 |
| 5,937,411 A | * | 8/1999 | Becker | 707/103 R |
| 6,009,442 A | * | 12/1999 | Chen et al. | 715/522 |
| 6,088,717 A | * | 7/2000 | Reed et al. | 709/201 |

* cited by examiner 00000101001010000000000100001111000101000100000100
00110100000101001101100100001100101000111100101

00000101 001010 000000 000100 001111 000101 00010 00000100
001101 000001 010011 011001 00000011 001010 001111 000101

00000101 001010 000000 000100 001111 000101 00010 00000100
    5      J      __     D    O    E    2    4

001101 000001 010011 011001 00000011 001010 001111 000101
  M     A     R     Y    3    J    O    E 00000101 001010 000000 000100 001111 000101 00010 00000100
    5      J      __     D    O    E    2   ①  4

001101 000001 010011 011001 00000011 001010 001111 000101
  M     A     R     Y   ②  3    J    O    E

+ metadata for semantics

Build object O1 with
    Alphabet info

Build object O2 with
    Metadata

Buid UVC program
    to decode data

Store O1,O2,O3 and the data
    itself as encapsulated object

2100

Initial file analysis
    Read UVC program

Invoke function to read
    alphabet information if (alphabet is not well known){
        read definition and build
    conversion matrix (*)
    }

Read metadata (**)

While (not finished){
        Invoke function (k) to retrieve data
            -> returns tag and data value Accumulate or consume data element
    }

(*) Note: in the worst case, the program may have to be interrupted if building the conversion matrix needs human involvement.

(**) same remark; client may want to write an ad hoc program to get the data (such as the one shown in Fig. 8. But it could also be written in a more generic way, using the metadata to guide the logic.

| Family 702 | Name 704 | Age 706 | Children 708 | |
|---|---|---|---|---|
| | | | Name | Age |
| | J. Doe 710 | 35 712 | Mary 714 | 9 716 |
| | | | Joe | 2 |
| | A. Smith | 44 | Isabel | 14 |
| | B. Jones | 21 | | |
| | G. Brown | 39 | Paul | 11 |

Structure: 720

Family [name char, age int, children [name char, age int] ]
   0       1       1           1       2       2

Figure 7 employees
    employee
        e_name          JOHN
        e_birthyear     1937
        dependent
            d_name          JOE
            d_birtyear      1962
        dependent
            d_name              MARY
    employee
        e_name          ANNE
        e_birthyear     1943
    employee
        e_name          CHARLES
        dependent
            d_name              THOMAS
            d_birthyear     1995
        dependent
            d_name              LAURA
            d_birtyear      1997

Figure 8

The Interface (cont.)

*2. Data*

```
open (bit stream)
while (more) {
        get_field (level, x)
}
```
900

For each field, the value is returned in variable x, with an index identifying the fields by their sequential positional index:

Family [name char, age int, children [name char, age int] ]   902
            1          2           3        4

| 904 | 906 |
|---|---|
| 1 | J. Doe |
| 2 | 35 |
| 3 | Mary |
| 4 | 7 |
| 3 | Joe |
| 4 | 2 |
| 1 | A. Smith |
| 2 | 44 |
| ... | |
| Etc. | |

In 2000

For computer

Build object O1 with
  alphabet info

Build object O2 with
  Metadata

Build object O3 containing
  UVC program emulating
  the M2000 instructions

Store O1,O2,O3 and the M2000
  code as encapsulated object

For an I/O device

Build object P1 with
  alphabet info

Build object P2 with
  metadata

Build object P3 containing
  UVC program emulating
  the functioning of the
  Control unit/device Store P1,P2,P3 in the encapsulated
  object

In 2100

A UVC interpreter must be developed for M2100.
A mapping program must be written to map the result of P3 (the logical data)
  onto a 2100 device.

Then, at run time:

Load the M2000 portion as data

Interpret that data using the UVC
  program in O3

If I/O operation is found {
        Interpreter passes arguments to I/O routine P3
        Routine P3 is executed and invokes mapping routine
        Mapping routine input/output data from/to 2100 device.
    }

Figure 10

LONG TERM ARCHIVING OF DIGITAL INFORMATION

BACKGROUND OF THE INVENTION

1. Field of Invention

The present invention relates generally to the field of archiving digital information. More specifically, the present invention is related to creating and storing a model of a universal virtual computer enabling recovery of long time archived digital information.

2. Discussion of Prior Art

The report of the Task force on Archiving of Digital Information, commissioned by the Commission on Preservation and Access and the Research Libraries Group states: "The digital information is still relatively uncultivated at this stage; but the need is urgent, the time is opportune and the conditions are fertile for a strong, far-sighted set of actions to plant the appropriate seeds to help ensure that the digital record ultimately matures and flourishes." The same opinion is also voiced by the industrial sector which sees more and more of their vital data generated and stored in digital form.

There is currently a very limited amount of related activity in the computer science community. This is probably due to the inherent long-term aspect of the problem when so many short term issues may offer a more rapid pay-off.

The following describes some of the technical challenges and prior art solutions.

The problem that libraries are facing today is well known. For centuries, paper has been used as the medium of choice for storing text and images. As shown in FIG. 1, a "paper" document has the advantages of: being a physical object with permanency, remaining readable with a slow degradation rate, remaining understandable (i.e., its structure is known), and being readily available to the reader.

Today, some of the archived objects (books, newspapers, pictures, etc.) are in danger of destruction. What should be done to protect their contents? They could essentially be copied (on paper or microfilm) or digitized. Digitization through a digital camera or a scanner replaces the image by a bit stream. This offers many advantages. First, the object can be copied repeatedly without degradation; its contents can be sent remotely and can be accessed at will. Finally, the physical space needed to store the object becomes smaller and smaller as storage density increases.

Another argument for digitization is that a high percentage of the data to be preserved is, today, generated directly in digital form. Musical CD's or DVD movies are obvious examples. But the same is true of many engineering designs which were described as blueprints in the past and now exist as digital information in a Computer-Aided-Design system with multimedia, relational database, and virtual reality. And what about all the electronically sent messages that have replaced the memos and letters?

FIG. 2 illustrates an electronic conversion 213 of existing paper text 202 and images 204 (e.g. books 200) and recorded media comprising sound 208 (e.g. records) and/or video 210 (e.g. films) to digital data 216. In addition to converted physical or analog sources, data created by electronic processes 214, such as e-mail, word processors, digital camera, etc.

In the future, the volume of the digital information will increase exponentially and dwarf the volume of the existing paper information. Thus, it makes sense to digitize what needs to be saved of the past, and concentrate on the single problem of preserving digital information for posterity.

FIG. 3 illustrates some of the problems with the storage of information as digital data. A particular storage medium 300, such as a disk, will have a limited physical lifetime. At a later time in the future it is unknown if a machine reader 302 will still be compatible or if the data bit string 304 will remain readable. As technology changes, no guarantees exist for a proper interpretation of bit strings to produce the information they originally represented 306. FIG. 4 illustrates the steps needed to decode the data.

Suppose we use a computer (identified as M2000) to create and manipulate digital information today. For the purpose of archiving the data for preservation, the digital information is stored on a removable medium, say D2000 (most probably some kind of disk). Suppose that, in 2100, somebody (the client) wants to access the data saved today. What mechanism should exist to be able to satisfy the request?

Four conditions must be met:
1. The particular D2000 disk must be found.
2. D2000 must be physically intact.
3. A machine must be available to read the raw contents (bit stream) of D2000.
4. The bit stream must be correctly interpreted.

Condition 1: this is not a new problem; any digital object must be "published" under a certain name, catalogued, and stored in a safe place; some attributes may also be stored, such as date, author, title, etc. All this is not different from the data maintained by current libraries.

Condition 2: some researchers predict very long lifetimes for certain types of media, but others are much less optimistic. Anyway, if a medium is good for N years, what about preservation for N+1 years? Whatever N is, the problem does not go away. There really seems to be only one solution to this problem: to copy the information periodically to rejuvenate the medium.

Condition 3: machines that are technologically obsolete are hard to keep in working order for a long time. Actually, this condition is more stringent than the previous one. Here also, rejuvenation is needed, moving the information onto the new medium that can be read by the latest generation of devices. Thus, conditions 2 and 3 go hand-in-hand. It must be noted that rejuvenation is not simply an overhead for preservation; it also allows for using the latest storage technology.

The three conditions above ensure that a bit stream saved today will be readable, as a bit stream, in the future. But there still remains one additional condition.

Condition 4: one must be able to decode the bit stream to recover the information in all its meaning. This is quite a challenging problem.

Digital objects can vary greatly in complexity. A digital object generally corresponds to what we designate as a file today. It contains either data or an executable program. We identify the following three types:

Type 1. A data object may be readily understandable by a human reader, or it may have to be decoded in some way by the reader or by a machine (assuming one knows the decoding rules). In the latter case, a program must be written in 2100 to decode the data, based on the stored description. A text in ASCII, an image, a digital video clip, a table with ASCII fields, are all examples of simple data objects.

Type 2. If the encoding of the data becomes more complex (example: an image compressed by a JPEG algorithm), the best way to describe the algorithm is to store with the data a program that can be used to decode the data.

Type 3. Going a step further, we may also be interested in archiving a computer program or system for its own sake. In this case, it is the ability to run that program that must be preserved by the archiving mechanism. Not only the bit stream that constitutes the program must be archived, but we must also make sure that the code can be executed at restore time. If you want to preserve the look and feel of Window 95 or MAC, or the user interface of a Computer Aided Design system, the only solution is to archive the whole body of code used during the execution, and enough information on how to run the code at restore time.

Below, we lump together types 1 and 2 under the heading of data archiving: this is because the same technique applies to both types. Type 3 is referred to as program archiving.

Previous Proposals

In *Avoiding Technological Quicksand: Finding a Viable Technical Foundation for Digital Preservation,* a report to the Council on Library and Information Resources (January 1999), J. Rothenberg sketched out an overall system organization based on encapsulating everything needed to decode the information when needed.

In summary, he proposes to store in an encapsulated object 500:

A. a description of the alphabet used to store text 502;

B. a mostly textual description of the metadata 503 (the semantic of the stored data);

C. the data as a bit stream 505;

D. the program, also as a bit stream, that was used to store and manipulate the data (this program runs on M2000), including, if needed, the operating system and other necessary components 504;

E. the detailed description of the M2000 architecture 504.

In 2100, the client will have to read the metadata B to understand the meaning of the archived information and to know how to run the program D. However, before being able to run D, an M2000 emulator for the M2100 machine will have to be written, based on the description E of the M2000 architecture.

Although we subscribe to the overall idea of encapsulation, we identify three drawbacks of its proposed embodiment:

a. The emphasis on archiving the original executable bit stream of the application program that created or displayed the document (including the operating system). This may be justifiable for program archiving but is mostly an overkill for data archiving. In order to archive a collection of pictures, is it necessary to save the full system that enables the original user to create, modify, retouch pictures when only the final result is of interest for posterity. If Lotus Notes® is used to send an e-mail message in the year 2000, is it necessary to save the whole Lotus Notes environment and reactivate it in 2100 in order to restore the note contents? But there may even be a worse drawback: the system may display the data that it manages but not necessarily have an export facility. In that case, it would be impossible to get the data out of the old system and into a new one. Actually, what is needed is a program that knows how to get the data of an object, maybe with the needed formatting information, so that it can be transferred to a newer system (a kind of generalized export facility).

b. The need for writing an emulator of an M2000 machine in 2100. First, this is a very complex operation. Second, it has to be done in 2100 for all possible pairs of machines <M2000, M2100>. Third, it can be done only if the description of the M2000 architecture is perfect and complete. But even then, how do we know the emulator works correctly since no machine M2000 exists for comparison.

c. The absence of a model for the metadata. Using a textual description of what the data mean and how it is organized requires that the metadata be read before a program may be written to decode the data.

The present invention recognizes that, if the metadata follows a specific model, a general purpose program can query the metadata and automatically decode the data according to the information found in the metadata. In other words, it becomes possible to browse through the data without having to develop a specific program for each data type.

Other prior art includes:

Gilheany (INSPEC—"Preserving Information Forever and a Call for Emulators", *Records Management Bulletin,* no.88, pp.23–31, October 1998) discusses the need for preserving information forever. Long term preservation must be able to preserve meta data as well as data and use emulators to permanently preserve the essence of the machines that execute the algorithms that convert abstract data into viewable images. The emulators must reproduce chronologically accurate images printed from common word processing programs.

Giguere (INTERNET—"Automating Electronic Records Management in a Transactional Environment: The Philadelphia Story", http://www.asis.org/Bulletin/Jun-97, 6/97) discloses the need for records management for the long time archiving of electronic records. One approach requires that certain information be preserved with electronic files to make them meaningful, creating a self-contained, self-sufficient electronic record packaged into a uniform electronic record data structure. The contextual-information-binding RDR record encapsulation approach will gather the required contextual information from a variety of locations (e.g., operating system, application/platform interface, specifically coded system "traps"), reformat this information into a standardized data structure and create an electronic record.

The patent to Chan et al. (U.S. Pat. No. 5,339,419) discloses the prior art ANDF approach of using tagged executable code. The software distribution format contains two parts: the executable code in the native computer platform's matching language and information covering the native computer platform's machine language (the key).

The patents to Demers et al. (U.S. Pat. No. 5,278,978) and Adair et al. (U.S. Pat. No. 5,416,917) disclose preserving and understanding the data exchanged between dissimilar relational database management systems. The system establishes layers of descriptive information to isolate machine characteristics, levels of support software, and user data descriptions. A different-type database contains predefined descriptions of the machine environments and database language structures for each database with which it can perform distributed database processing.

The patent to Boegge et al. (DE 19613666) discloses a processing system having a data server for both short and long-term archives. An exchange archive connected to the data server holds data models describing the plant process.

Bowdidge et al. (INSPEC—"Automated Support for Encapsulating Abstract Data Types", *SIGSOFT Engineering Notes,* v.19, n.5, pp.97–110, December 1994) discloses using a meaning-preserving program restructuring tool that creates a new abstract data type by encapsulating an existing data structure. Data encapsulation simplifies modification by isolating changes to the implementation and behavior of an abstract data type.

Miles (INSPEC—"Structural Realizations of Program Schemata", Michigan State Univ., 206 pp.) Discloses using finite state theory to synthesize and detect common program structures ("controls" or "schemata") identified as sequential machines. The program computation is described as an interpretation or mapping on these structures.

Nijssen (INSPEC—"Storage and Document Servers", *Second International Summer School on the Digital Library*, pp.77–92, 1997) discusses aspects of long-term archiving of document collections in a digital library for access by specialized historians. Three implementations are discussed: Webdoc, developed by Pica; Science Server by Orion; and Decomate.

As described above, many problems exist with prior art solutions to the long term storage of digital data and future recovery thereof. Whatever the precise merits, features and advantages of the above solutions, none of them achieve or fulfill the purposes of the present invention.

SUMMARY OF THE INVENTION

Digital data is preserved by archiving on a removable medium. In the long term, the save data bit stream must be correctly interpreted. For a computer program or system to be archived, the bit stream constituting the program must be archived and the code must be executable at restore time. The program that restores the data does not "see" the contents of the data itself, but accesses it by issuing function calls to an executor. A description of which methods are, available to restore the information hidden in the data and what they return is available in the metadata. A text tells the client which functions are available and what their purposes are.

The archiving method is based on using a virtual computer instruction set and saving the algorithm that decodes the data (the method) as a program in that virtual machine language. For machine instructions to be executed many years later, for example 100 years, an emulator of the original machine would be written on the future hardware. Any machine manufactured in the originating year would develop for each architecture a Universal Virtual Computer (UVC) description of the machine. Each originating instruction would be mapped into a small program of UVC instructions. All manufacturers of new architectures would then have to write a UVC executor which would be able to execute UVC instructions on the machine running 100 years in the future. Any invocation of the methods returns data in a certain format. That format must be natural and simple so that it remains relevant in the future. A simple data model is used to describe that format to the future user.

BRIEF DESCRIPTION OF THE DRAWINGS

FIG. 4 illustrates the steps in decoding of the data.

FIG. 6 illustrates the overall process of the present invention for data archiving.

FIG. 7 illustrates the metadata as returned to the future client.

FIG. 8 illustrates the data as returned to the future client.

FIG. 10 illustrates an overview of the present invention for archiving programs.

DESCRIPTION OF THE PREFERRED EMBODIMENTS

Figure 1:
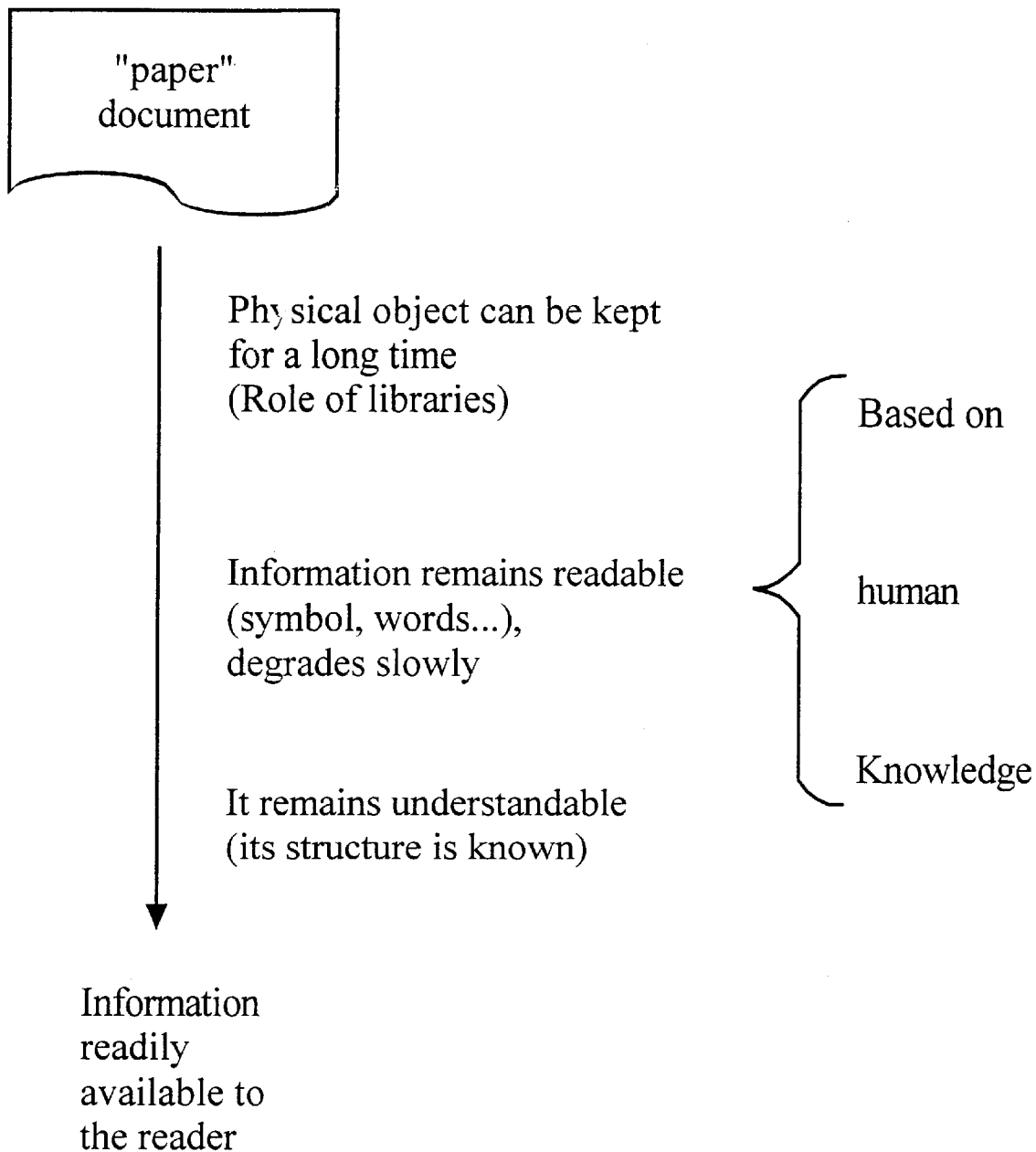
FIG. 1 illustrates the advantage of "paper" as a storage medium.
Figure 2:
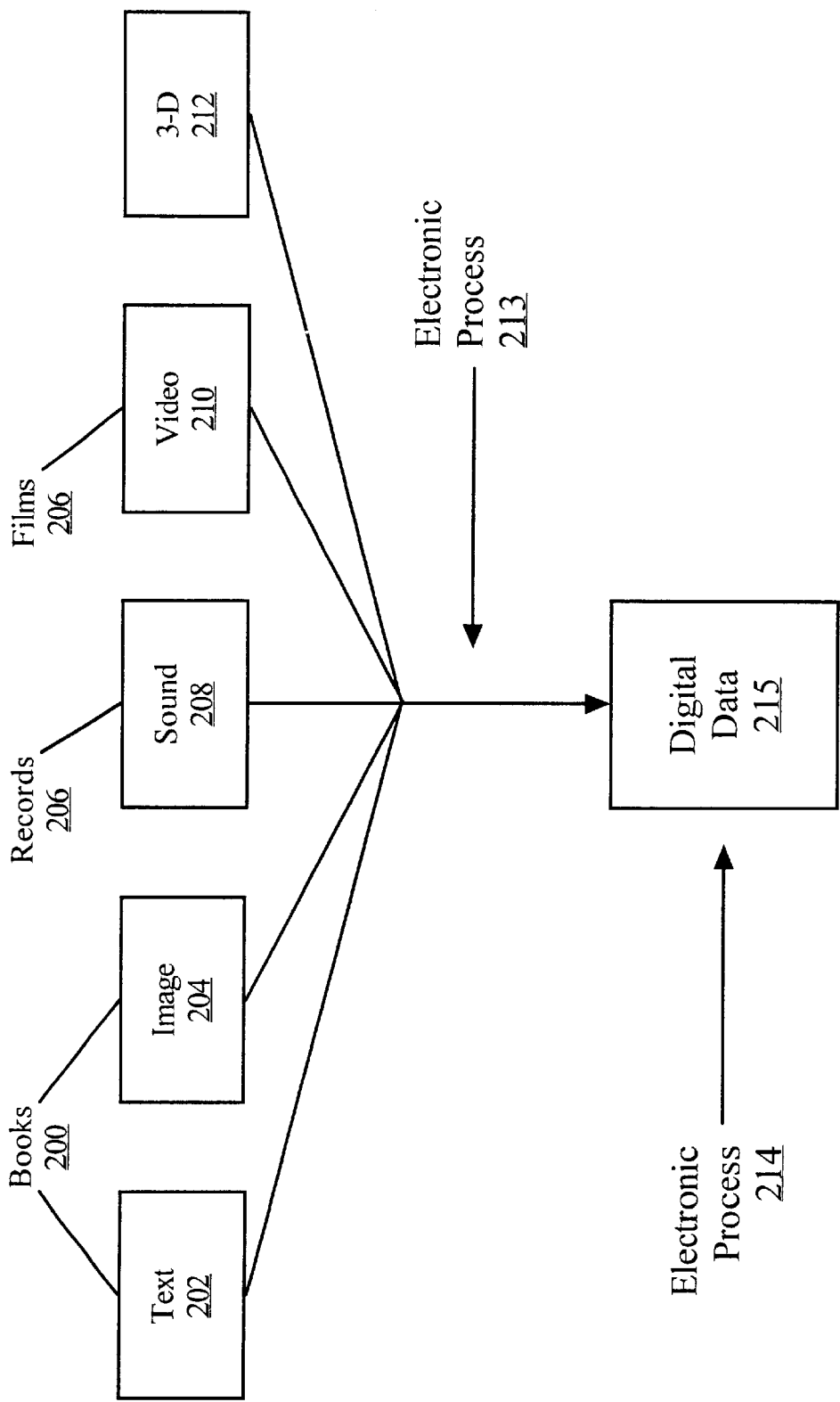
FIG. 2 illustrates an electronic conversion to digital data.
Figure 3:
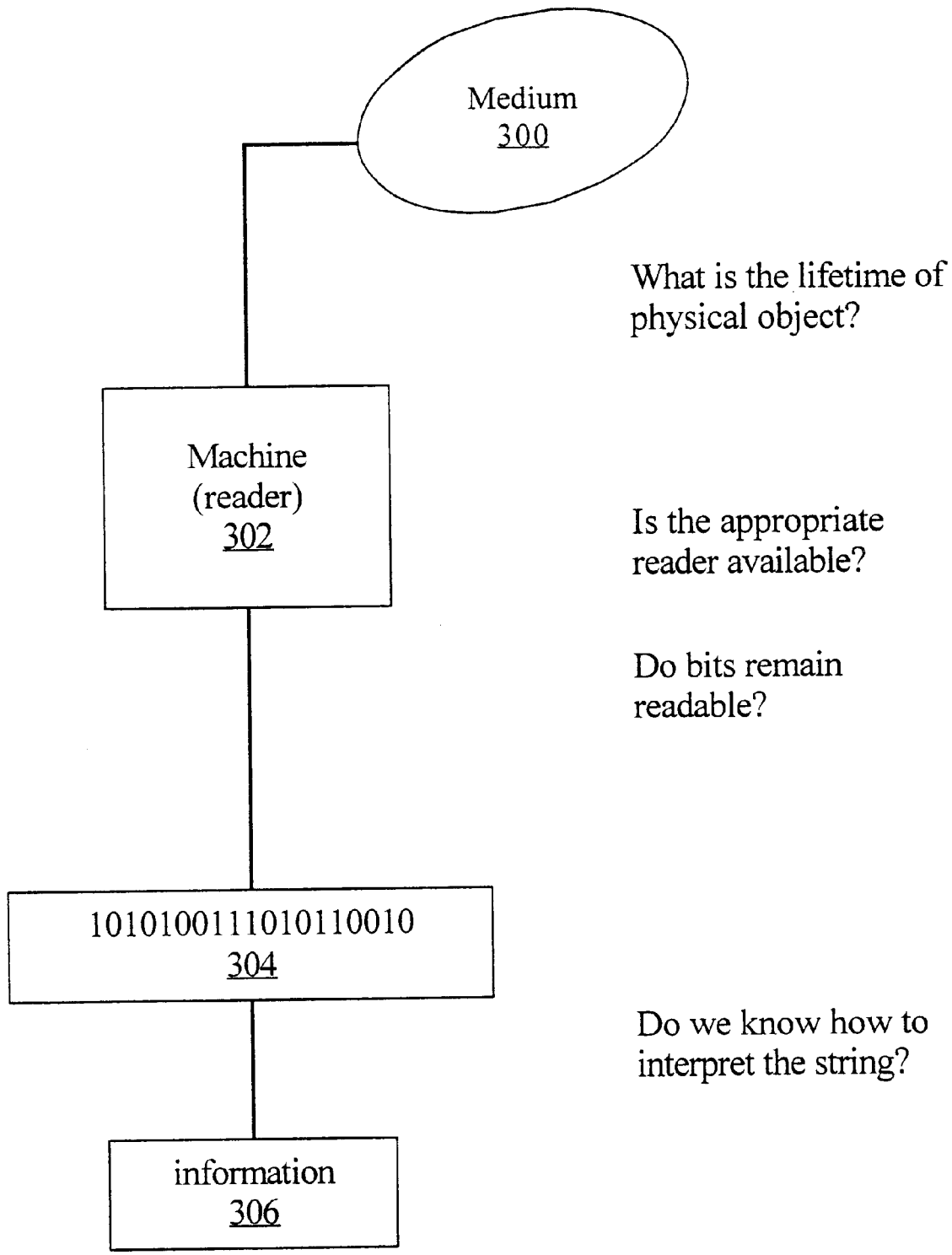
FIG. 3 illustrates some problems with digital information.
Figure 5:
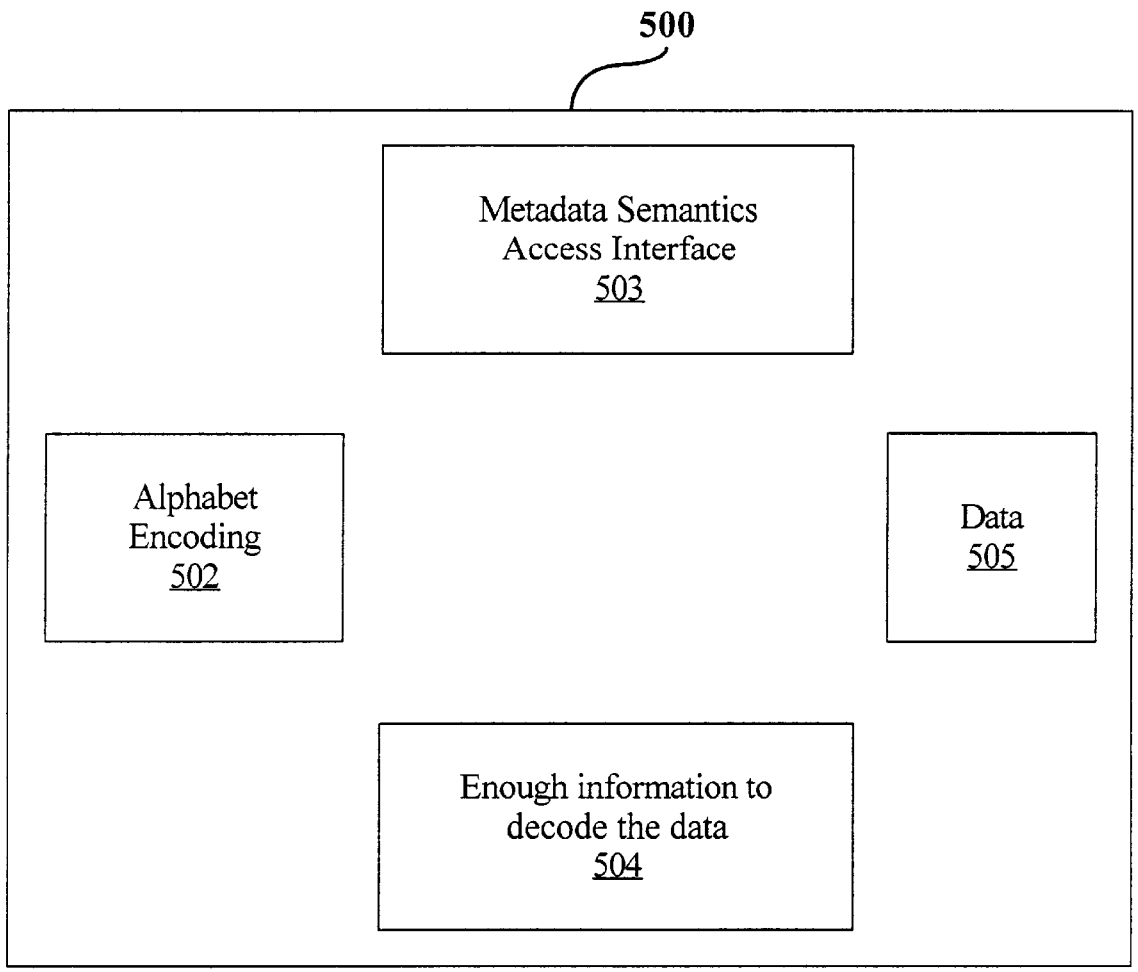
FIG. 5 illustrates a known prior art concept of an encapsulated archival object.

While this invention is illustrated and described in a preferred embodiment, the device may be produced in many different configurations, forms and materials. There is depicted in the drawings, and will herein be described in detail, a preferred embodiment of the invention, with the understanding that the present disclosure is to be considered as a exemplification of the principles of the invention and the associated functional specifications of the materials for its construction and is not intended to limit the invention to the embodiment illustrated. Those skilled in the art will envision many other possible variations Within the scope of the present invention.

As described above, prior art solutions propose to store in an encapsulated object:

A. a description of the alphabet used to store text;

B. a mostly textual description of the metadata (the semantic of the stored data);

C. the data as a bit stream

D. the program, also as a bit stream, that was used to store and manipulate the data (this program runs on M2000), including the operating system and other necessary components).

Archiving a Data File

The encapsulated object contains the same components A, B and C described above; D is different, and E is not needed anymore.

D is now seen as one or more programs (methods, as in object programming) that can be invoked by a client to recreate the contents of the object.

The client program does not "see" the contents of the data itself, but accesses it by issuing a function call to an executor; the parameters specify which method is to be invoked. As in any object-oriented scheme, the interface to the methods deals with data at the logical level, while the data itself may be stored as an internal, implementation dependent level; the methods are actually routines that decode the bit stream into data immediately usable by the client. The returned data, at a logical level, is much more understandable to the client. It is generally intrinsic to the type of data and therefore is much easier to explain. A description of which methods are available to restore the information hidden in the data, is always available, and part of the metadata.

Specification of Methods

Clearly, the methods in D constitute the key to the decoding of the data. How are these methods specified? Some possibilities:

1. Describe the algorithm in a natural language. The difficulties are well known; and computers scientists have invented all kinds of codes and pseudo-codes to avoid them, leading to the next item:

2. Use a high level language; however, high level languages are designed to facilitate the writing of a program. They always try to incorporate the latest features that may facilitate program development; every five or ten years, something new seems to come along and the current language gets obsolete.

3. Use the machine language of the computer on which the algorithm runs in 2000. This is the option that requires a full emulation of the M2000 to be written at restore time; we have discussed the difficulties above.

Instead, the present invention describes the methods as programs written in the machine language of a Universal Virtual Computer (UVC). The UVC is a computer in its functionality; it is virtual because it will never have to be built physically; it is universal because its definition is so basic that it will endure forever.

The UVC program is completely independent of the architecture of the computer on which it runs. It is simply interpreted by a UVC Interpreter. A UVC Interpreter can be written for any machine. Actually, there is nothing to be saved in E since the architecture of M2000 becomes irrelevant.

This approach does not have the drawbacks of the method 3 above. If a UVC program is written in M2000, it can be tested on a UVC interpreter written in 2000 for an M2000 machine. If ten years later, in 2000+10, a new machine architecture comes up, a new UVC Interpreter can be written. It can be checked by running the same UVC program through both the 2000 and 2000+10 UVC Interpreter. In other words any UVC Interpreter can be checked by comparison with the Interpreter of the previous generation.

Note that the simpler the structure of the data to be archived, the simpler the UVC program needed to restore the information later on.

In addition, the UVC can be very simple—and at the same time very general, so that writing an interpreter at any time remains a simple task, far from the complexity of writing a full machine emulator.

Interface to the Methods

In 2100, a machine M2100 will come with a restart program that will read the contents of the encapsulated object in a virtual memory and then issue requests to the UVC Interpreter. Some of these requests (Class 1) are part of the universal interface that will be known from generation to generation. Others (Class 2) depend on the data; they are specific to a class of object.

A UVC has a set of registers simulated by the interpreter. A request will put some values into some specific registers before giving control to the interpreter which will execute each instruction in the UVC program, sequentially. The registers used at the interface level are:

Reg 0: an integer (k) indicating which function is being invoked

Reg 1: a pointer to the data stream

Reg 2: a pointer to memory to return the tag (logical type of the data) or a completion code returned by the function.

Reg 3: the length of the tag returned (in bits)

Reg 4: a pointer to memory to return the data

Reg 5: the length of the data returned (in bits)

Reg 6: a pointer pw to a working area

Class 1 Requests

Request for alphabet: k=0

The UVC Interpreter reads a displacement at *Reg 2 to branch to the UVC code. It interprets the code that computes the location of the code for function 0, and starts interpreting. Function 0 returns in *reg 3 an ASCII description of the alphabet used to encode the characters. It contains the name of the alphabet used for character strings (using a subset of a very well known alphabet such as ASCII) and, just in case, a full definition such as: USE 8 BITS PER CHARACTER: "A" 80 "B" 81 . . . "A ACCENT GRAVE" 122 . . . "U UMLAUT" 155 . . .

Request for metadata: k=1

It returns the metadata (expressed in the alphabet identified above).

The metadata describes which Class 2 requests are available, what type of data each request returns, what the data mean, etc.

This is done by adopting a data model. The model is linear so that its mapping onto the bit stream remains simple. Flat files, as in the relational model, certainly satisfy that requirement. But, so do hierarchies—at least along one single hierarchical path. Since the present invention is not concerned about query language, an old and traditional repeating group model can be used. Not surprisingly, XML, which is also concerned about exchanging information between different consumers, is based on the same basic model as described by E. R. Harold in XML, *Extensible Markup Language* (IDG Books Worldwide, 1998). When appropriate, the present invention uses the XML constructs. This is only a preferred embodiment of a model. Other equivalents may be envisaged.

Considering again the data in FIG. 4, the data consist of entries. Each entry consists of a sequence of fields, like in flat files. But each field can itself be a list of entries made of fields that can be lists, etc. The repeated group structure looks like this:

Employees [employee_name, birth_year,
    dependents [dependent_names, birth_year]]

The same structure (and types) can be defined in a simple subset of XML, as follows:

DOCUMENT Employees[
    ELEMENT employees (employee*)
    ELEMENT employee (e_name+, e_birthyear?,
        dependent*)
    ELEMENT dependent (d_name+, d_birthyear?)
    ELEMENT e_name (CDATA)
    ELEMENT e_birthyear (NDATA)
    ELEMENT d_name (CDATA)
    ELEMENT d_birthyear (NDATA)
]

The token * means a certain number of . . . ; + means that the item must be present; ? means optional. We introduce the special terms CDATA for character data and NDATA for numeric data. For the sake of presentation we also got rid of separators.

A way must be provided to be able to look at the metadata. A simple solution consists of using a Data Type Definition (DTD in XML). Logically, the metadata looks like this:

fields [level, name, description, type, attribute] or
DOCUMENT Metadata[
    ELEMENT fields (comment?, field*)
    ELEMENT field (level+, name+, description, type+,
        attribute?)
    ELEMENT comment (CDATA)
    ELEMENT level (NDATA)
    ELEMENT name (CDATA)
    ELEMENT description (CDATA)
    ELEMENT type (CDATA)
    ELEMENT attribute (CDATA)
]

The level specifies the depth of a group (record) in the hierarchy; it takes care of the recursion. The client queries the metadata using a mechansm that is very similar to the one used to restore data (described in a section below). The output of the metadata retrieval is shown in FIG. 7.

The introduction of a data model like the one presented above accomplishes the following: it defines a universal interface for accessing the archived data. Since it is universal, its definition may have to be stored in more than one place but it certainly does not need to be stored with each archived object.

Class 2 Requests

Class 2 requests actually return the data. Knowing the metadata, the client knows exactly the type of information that is expected. The application executes the following sequence (expressed here as a piece of pseudo-code in some kind of high level language).

```
open object
while (more) {
  get_field (tag, x)
}
```

Figure 9:
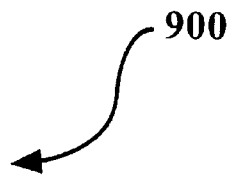
FIG. 9 illustrates the pseudo code for decoding the data.

For each field, the value is returned in variable x (x is actually a structure containing the value together with an indication of the length) with a tag identifying the field. In the example, the repetitive call to get_field would return the data in the form described in FIG. 8. The logic used to retrieve the data elements in the order shown in the hierarchy is illustrated in FIG. 9. Since the same method is invoked repeatedly, the state of the process must be saved at each call: this includes the tag of the data element to be returned and, if the tag is 'dependent', the number of dependents still to be processed.

Now, we look more carefully at the UVC architecture and the method used to retrieve the data; as mentioned above, the method is written in the UVC machine language. For example, we consider the section of code corresponding to the lines [901],[902] in FIG. 9. Again, as in FIG. 4, the data is encoded as:

4JOHNa23JOEb4MARYc where a, b, c are 16-bit integers with respective values 1937, 1962, 0 (for unknown).

It is important to note that the UVC never needs to be implemented physically. Therefore there is no actual physical cost. For example, the UVC can have a large number of registers; each register has a variable number of bits plus a sign bit. The UVC has an unlimited sequential bit-oriented memory. Addresses are bit-oriented (so that a 9-bit "byte" computer can be emulated as easily as an 8-bit one). Also, since speed is not a real concern (these programs are run only to restore the data, which are then stored in actual M2100 systems for actual use), a small set of instructions is sufficient. This reduces the amount of work involved in developing an emulator of the UVC instructions onto a real M2100 machine. Writing UVC program themselves is not an issue since compilers will be written to translate high level languages (which will change in time) into UVC instructions (which will not).

The UVC program for lines [901–4] is shown in FIG. 9.

It uses a self explanatory assembler form for loading n bits onto a register (from a register Reg or a memory address *Reg) or moving n bits from memory to memory (where the memory addresses are specified in registers. The number of bits involved is also stored in a register.

Highlights of the Approach

The existence of UVC drastically simplifies the emulation problem:

For data preservation, it eliminates the need for agreeing on standardized formats. Anybody who wants to preserve a file can use any format but must make sure that UVC routines are supplied.

Only the UVC emulator will have to be written when a new architecture emerges. There is no impact on the archived information.

The UVC can be made so general, and at the same time so basic, that its definition will remain relevant in the future.

Organization of the Bit Stream

As a result of the universal interface and the fact that the actual extraction of the data is performed by the—also archived—decoding algorithm, the bit stream organization becomes very simple, consisting of:

| Tag | La | A | Lt | T | S |
| --- | --- | --- | --- | --- | --- | where the meanings of the various fields are:

Tag: 8 bits—see below

La: 32 bits that contain (right justified) the binary representation of the length (in bits) of the field A A: the name of a well known alphabet (such as ASCII, EBCDIC, etc . . . ), expressed as ASCII characters. This is the encoding under which the client will be able to read the field T.

Lt: the length (in bits) of the following field, T.

T: the description of the alphabet encoding for character string data. Note that Lt can be 0 and T empty if the alphabet is the same as the one specified in A.

S: The data and methods

Clearly, in 2100, the stream can be decomposed easily in its various components. The interpretation program simply skips 8 bits, interprets the following 32 bits as a length La, reads the La following bits and decomposes them into ASCII characters. This yields the name of the alphabet encoding for T. The program then considers the next 32 Lt bits, interpreting them as an integer specifying the length of T, reads the next Lt bits as T and passes the address of S to the executor, which takes control.

Note that, in order to restore the information, the present invention relies on two assumptions: that the content of A is stored in ASCII, and that the lengths are stored as 32-bit integers. These assumptions can be made today, well publicized, and identified as assumptions 0. The value zero is stored as a binary value in the tag. So, a restore program will always first look at the tag and start the decoding using the appropriate assumptions. In the future, if there is ever a reason for changing these assumptions, a tag 1, then 2, etc. can be used.

Archiving Programs

In this case, the information to be archived is itself a program.

The Straightforward Emulation Approach

In the straightforward emulation approach, an emulator of M2000 is written, at restoration time, on the M2100 machine. Then, that emulator will be able to run the old code. But, writing an emulator for the M2000 in 2100 may be a problem, since no version of M2000 will be in existence; so nobody will know exactly what the right execution should be. Also, any new machine will have to have an emulator to run M2000 programs.

In this case, the information stored is itself a program. If the program is only a series of native instructions of the M2000, it may not require the saving of any other package or operating system. However, if the object is a full running system with Input/Output interactions, then not only the emulator must be available, but the operating system as well.

On the contrary, the present invention does not require the writing of a complex M2000 emulator in 2100. The UVC approach can be naturally extended to support the archiving of programs. Instead of archiving the data in D and the UVC to decode the data in C, the program (the executable code for M2000) will be stored in D and a UVC program that emulates the functioning of M2000 will be stored in C. This time, in 2100, the UVC Interpreter will interpret the M2000 machine instructions. That interpretation will perform exactly as the original program on an M2000. This suffices if the program does not have any interaction with the external world (Input/Output operations or interrupts).

We now look at Input/Output operations. Suppose the program prints on an all-point-addressable black/white printer. The program somewhere issues a Start I/O operation with some data. Clearly the execution of that instruction is not part of the M2000. The M2000 only sends the data to an output device control unit which actually performs the operation. Our proposal for extending the method to support such operations is as follows.

In addition to archiving the UVC program that interprets the M2000 code, another UVC program that mimics the functioning of the control unit must also be archived. Finally that emulator must output the page on whatever device will exist in 2100. That part cannot be anticipated in 2000. The present invention defines an abstract all-point-addressable printer which is invoked with the parameters (l, w, pixels) where l represents the number of pixel lines in the page, w the number of pixels per line and pixels, a bit stream of l times w pixels. In 2100, the abstract machine will map the pixels into an actual device.

This scheme, again, ensures that the difficult part (which depends heavily on the details of the device) is written in 2000 when the device exists. It can be fully tested in 2000 by mapping the abstract device into a 2000 device.

Abstract devices must be similarly defined for sequential tapes (with operations such as R, W, Rewind, Skip), for random access storage units (R, W at a particular record address), for sequential character output or input (screen, keyboard), for x/y positioning (mouse, touch-screen, cursor), etc.

In summary,

In 2000, for each existing or new machine, the manufacturer needs to provide an emulator of the M2000 written as UVC code. Manufacturers of devices in 2000 need to provide UVC code that emulates the device control unit.

In 2000, whoever creates a new data format needs to produce a UVC program to decode the data.

In 2100, every machine manufacturer needs to produce a UVC interpreter. Each device manufacturer needs to produce an implementation of the abstract device on the particular 2100 device.

Summary and Conclusions

The present invention analyzes the challenges of the 100-year problem: how to archive digital information that is being created so that it may be readable a century from now and beyond.

We made a distinction between the archiving of data and the archiving of a program to be executed.

The same technique is used to solve both problems: both rely on a virtual computer. For archiving data, the UVC is used to archive methods to access the data. For archiving a program, the UVC is used to specify the functioning of the original computer.

What the method accomplishes is to avoid the problem of defining standards under which the data should be stored. These standards would have to be defined for all types of applications, and would have to remain valid for centuries; this is just unfeasible. Instead, the present invention replaces the need for a multitude of standards (for each format) by a single standard on a UVC, which is actually independent of any application, and is so basic that it remains relevant in all ages.

It would be naive to think that solving the archiving problem is simply a technical challenge. For example, the success of any effort would hinge on the overall agreement of all parties generating new technologies or creating new types of information. But the computer science community has at least the obligation of trying to shed some light on the challenges, and to start addressing the problems.

The above UVC used to archive computer data and programs and its described functional elements are implemented in various computing environments. For example, the present invention may be implemented on a conventional IBM PC, mainframe, or equivalent, multi-nodal system (e.g. LAN) or networking system (e.g. Internet, WWW). All programming, GUIs, display panels and dialog box templates, and data related thereto are stored in computer memory, static or dynamic, and may be retrieved by the user in any of: conventional computer storage, display (i.e. CRT) and/or hardcopy (i.e. printed) formats.

CONCLUSION

A system and method has been shown in the above embodiments for the effective implementation of long term archiving of digital information. While various preferred embodiments have been shown and described, it will be understood that there is no intent to limit the invention by such disclosure, but rather, it is intended to cover all modifications and alternate constructions falling within the spirit and scope of the invention, as defined in the appended claims. For example, the present invention should not be limited by software/program, computing environment, specific computing hardware and UVC.

What is claimed is:

1. A method of archiving one or more of data and programs at time $T_1$ to ensure recovery at time $T_2$, $T_2 > T_1$, said method comprising:

A. for data archival, providing an encapsulated object comprising the following:
   1) description of the alphabet used to store text;
   2) a predominantly textual description of associated metadata;
   3) the data as a bit stream;
   4) code written as a series of Universal Virtual Computer instructions which can recreate the contents of the object, said code interpretable at time $T_2$ by a universal virtual computer interpreter;

B. for program archival, providing an encapsulated object comprising the following:
   1) description of the alphabet used to store text;
   2) a predominantly textual description of associated metadata;
   3) executable code of said program as a bit stream, and
   4) code written as a series of Universal Virtual Computer instructions which emulates the functioning of a $T_1$ computer which runs said program at time $T_1$, said code interpretable at time $T_2$ by a universal virtual computer interpreter.

2. A method of archiving one or more of data and programs at time $T_1$ to ensure recovery at time $T_2$, as per claim 1, wherein said archived data is independent of the architecture of a $T_1$ computer.

3. A method of archiving one or more of data and programs at time $T_1$ to ensure recovery at time $T_2$, as per claim 1, wherein $T_n$ universal virtual computer interpreters are directly comparable to other universal virtual computer interpreters $T_m$, $T_m<T_n$, to confirm proper operation thereof.

4. A method of archiving one or more of data and programs at time $T_1$ to ensure recovery at time $T_2$, as per claim 1, wherein said universal virtual computer comprises a set of registers which are simulated at time $T_2$ by said universal virtual computer interpreter.

5. A method of archiving one or more of data and programs at time $T_1$ to ensure recovery at time $T_2$, as per claim 4, wherein said registers comprise:

Reg 0: an integer (k) indicating which function is being invoked

Reg 1: the completion code returned by the function

Reg 2: a pointer p-data, pointing to the data bit stream

Reg 3: a pointer p_out to computer memory set aside to receive the result list.

Reg 4: a pointer pw to a working area.

6. A method of archiving one or more of data and programs at time $T_1$ to ensure recovery at time $T_2$, as per claim 1, wherein said encapsulated object comprises at least first and second class requests for said universal virtual computer interpreter.

7. A method of archiving one or more of data and programs at time $T_1$ to ensure recovery at time $T_2$, as per claim 6, wherein said first class request(s) are part of a universal interface and said second class request(s) depend on the data.

8. A method of archiving one or more of data and programs at time $T_1$ to ensure recovery at time $T_2$, as per claim 7, wherein said first class request(s) include at least a request for alphabet definition and request for metadata.

9. A method of archiving one or more of data and programs at time $T_1$ to ensure recovery at time $T_2$, as per claim 7, wherein said second class request(s) include at least a function of the data being restored.

10. A method of archiving one or more of data and programs at time $T_1$ to ensure recovery at time $T_2$, as per claim 1, wherein said metadata follows a hierarchical model.

11. A method of archiving one or more of data and programs at time $T_1$ to ensure recovery at time $T_2$, as per claim 1, wherein said universal virtual computer code is also archived.

12. A method of archiving one or more of data and programs at time $T_1$ to ensure recovery at time $T_2$, as per claim 1, wherein said bit stream is comprised essentially of:

Tag La A Lt T S where:

1) Tag identifies the conventions used for the length of La and Lt for the alphabet used for field A;

2) La is the number of bits that contain (right justified) the binary representation of the length in bits of field A;

3) A is the name of a well known alphabet;

4) Lt is the length in bits of the field T;

5) T is the description of the alphabet encoding for character strings, and

6) S is the data and methods.

13. A method of archiving one or more of data and programs at time $T_1$ to ensure recovery at time $T_2$, as per claim 12, wherein for Tag(0), A is ASCII and Lt is 32 bits.

14. A method of archiving one or more of data and programs at time $T_1$ to ensure recovery at time $T_2$, as per claim 1, wherein for program archival, said encapsulated object further comprises universal virtual computer code representing Input/Output device functions.

15. A method of archiving one or more of data and programs at time $T_1$ to ensure recovery at time $T_2$, as per claim 14, wherein said Input/Output devices are any of printers, sequential tapes, RAM, sequential character input or output, or x/y positioning.

16. A method of archiving one or more of data and programs at time $T_1$ to ensure recovery at time $T_2$, as per claim 15, wherein said universal virtual computer code representing said printers comprises a format:

(l,w,pixels)

where:

l represents the number of pixel lines per page;

w represents the number of pixels per line, and pixels is a bit stream of l times w pixels.

17. A method of archiving one or more of data and programs at time $T_1$ to ensure recovery at time $T_2$, as per claim 1, wherein said method is implemented across networks or existing communication mediums.

18. A method of archiving one or more of data and programs at time $T_1$ to ensure recovery at time $T_2$, as per claim 17, wherein said across networks element comprises any of LANs, WANs, cellular, Internet or Web(WWW) based networks.

19. A method of long-term archival of digital information, said digital information comprising any of digital data, programs or I/O device representations comprising the steps of:

a. building an object O1 with alphabet information;

b. building an object O2 with metadata;

c. building a universal virtual computer program object O3 to decode said digital information;

d. storing, in computer storage, O1, O2, O3 and said digital data as an encapsulated object.

20. A method of long-term archival of digital information, as per claim 19, wherein for the long-term archival of programs, the universal virtual computer program (stored in O3) is able to emulate the program operating on an original computer's instruction set—which is also stored in the encapsulated object, together with O1, O2, and O3.

21. A method of long-term archival of digital information, as per claim 19, wherein for the long-term archival of I/O device representations, the universal virtual computer program (stored in O3) is able to emulate the function of a control unit/device of a specified originating I/O device—which is also stored in the encapsulated object, together with O1, O2, and O3.

22. A method of long-term archival of digital information, as per claim 19, wherein recovery of said archived data includes decapsulation and interpretation steps comprising the steps:

a. reading said universal virtual computer program of O3;

b. reading said alphabet, if said alphabet is not recognized, reading definitions and building a conversion matrix;

c. reading said meta data;

d. interpreting said archived data using the O3 universal virtual computer program.

23. A method of long-term archival of digital information, as per claim 20, wherein recovery of said archived programs includes decapsulation and interpretation steps comprising the steps:

a. building a universal virtual computer interpreter for a specified computer;

b. building a mapping program;

c. loading the universal virtual computer program which emulates a program operating on an originating specified computer's instruction set as data;

d. interpreting said loaded data using the O3 universal virtual computer program to thereby interpret the archived program.

24. A method of long-term archival of digital information, as per claim 21, wherein recovery of said archived I/O devices includes decapsulation and interpretation steps comprising the steps:

a. building a universal virtual computer interpreter for a specified computer;

b. building an I/O mapping program;

c. loading said universal virtual computer program which emulates the function of said control unit/device of an originating specified I/O device as data;

d. interpreting said loaded data using the O3 universal virtual computer program to thereby interpret the archived program.

25. A method of long-term archival of digital information, as per claim 19, wherein said archived data is independent of an architecture of an originating computer.

26. A method of long-term archival of digital information, as per claim 19, wherein said universal virtual computer program comprises a set of registers which are simulated during recovery by a universal virtual computer interpreter.

27. A method of long-term archival of digital information, as per claim 26, wherein said registers comprise:

Reg 0: an integer (k) indicating which function is being invoked

Reg 1: the completion code returned by the function

Reg 2: a pointer p-data, pointing to the data bit stream

Reg 3: a pointer p_out to computer memory set aside to receive the result list

Reg 4: a pointer pw to a working area.

28. A method of long-term archival of digital information, as per claim 19, wherein said metadata follows a hierarchical model.

29. A method of long-term archival of digital information, as per claim 19, wherein said universal virtual computer program is also archived.

30. A method of long-term archival of digital information, as per claim 19, wherein said I/O device representations are any of printers, sequential tapes, RAM, sequential character input or output, or x/y positioning.

31. A method of long-term archival of digital information, as per claim 30, wherein said universal virtual computer program representing said printers comprises a format:

(l,w,pixels)

where:

l represents the number of pixel lines per page;

w represents the number of pixels per line, and pixels is a bit stream of l times w pixels.

32. A method of long-term archival of digital information, as per claim 19, wherein said method is implemented across networks or existing communication mediums comprising any of: LANs, WANs, cellular, Internet or Web(WWW) based networks.

33. An article of manufacture comprising computer readable code embodying a method of long-term archival of digital information, said digital information comprising any of digital data, programs or I/O device representations, said method comprising the steps of:

a. building an object O1 with alphabet information;

b. building an object O2 with metadata;

c. building a universal virtual computer program object O3 to decode said digital information;

d. retaining, O1, O2, O3 and said digital data as an encapsulated object, and wherein said encapsulated object can be decapsulated and interpreted at a time after an originating time of steps a–d to thereby recover said digital information.

34. An article of manufacture comprising computer readable code embodying a method of long-term archival of digital information, as per claim 33, wherein for the long-term archival of programs, the universal virtual computer program (stored in O3) is able to emulate the program operating on the original computer's instruction set—which is also stored in the encapsulated object, together with O1, O2, and O3.

35. An article of manufacture comprising computer readable code embodying a method of long-term archival of digital information, as per claim 33, wherein for the long-term archival of I/O device representations, the universal virtual computer program (stored in O3) is able to emulate function of a control unit/device of a specified originating I/O device—which is also stored in the encapsulated object, together with O1, O2, and O3.

36. An article of manufacture comprising computer readable code embodying a method of long-term archival of digital information, as per claim 33, wherein recovery of said archived data during said decapsulation and interpretation steps comprises the steps:

a. reading said universal virtual computer program of O3;

b. reading said alphabet, if said alphabet is not recognized, reading definitions and building a conversion matrix;

c. reading said meta data;

d. interpreting said archived data using the O3 universal virtual computer program.

37. An article of manufacture comprising computer readable code embodying a method of long-term archival of digital information, as per claim 34, wherein recovery of said archived program(s) during said decapsulation and interpretation steps comprises:

a. building a universal virtual computer interpreter for a specified computer;

b. building a mapping program;

c. loading the universal virtual computer program which emulates a program operating on an originating specified computer's instruction set as data;

d. interpreting said loaded data using the O3 universal virtual computer program to thereby interpret the archived program.

38. An article of manufacture comprising computer readable code embodying a method of long-term archival of digital information, as per claim 35, wherein recovery of said archived I/O device representations during said decapsulation and interpretation steps comprises the steps:

a. building a universal virtual computer interpreter for a specified computer;

b. building an I/O mapping program;

c. loading said universal virtual computer program which emulates the function of said control unit/device of an originating specified I/O device as data;

d. interpreting said loaded data using the O3 universal virtual computer program to thereby interpret the archived program.

39. A system providing for long-term archival of digital information, said digital information comprising any of digital data, programs or I/O device representations comprising:
   a. a first object developer, said first developer building an object O1 with alphabet information;
   b. a second object developer, said second developer building an object O2 with metadata;
   c. a third object developer, said third developer building a universal virtual computer program object O3 to decode any of said digital data, programs and I/O device representations, and
   d. computer storage retaining O1, O2, O3 and associated digital data, programs and I/O device representations as an encapsulated object.

40. A system providing for long-term archival of digital information, said digital information comprising any of digital data, programs or I/O device representations, as per claim 39, wherein said system further comprises a decapsulater and interpreter to thereby recover said archived digital information.

41. A system providing for long-term archival of digital information, said digital information comprising any of digital data, programs or I/O device representations, as per claim 39, wherein said archived digital data is independent of the architecture of an originating computer.

42. A system providing for long-term archival of digital information, said digital information comprising any of digital data, programs or I/O device representations, as per claim 39, wherein said universal virtual computer comprises a set of registers which are simulated during a recovery of said archived digital information by a universal virtual computer interpreter.

43. A system providing for long-term archival of digital information, said digital information comprising any of digital data, programs or I/O device representations, as per claim 42, wherein said registers comprise:
   Reg 0: an integer (k) indicating which function is being invoked
   Reg 1: the completion code returned by the function
   Reg 2: a pointer p-data, pointing to the data bit stream
   Reg 3: a pointer p_out to computer memory set aside to receive the result list
   Reg 4: a pointer pw to a working area.

44. A system providing for long-term archival of digital information, said digital information comprising any of digital data, programs or I/O device representations, as per claim 39, wherein said metadata follows a hierarchical model.

45. A system providing for long-term archival of digital information, said digital information comprising any of digital data, programs or I/O device representations, as per claim 39, wherein said universal virtual computer program is also archived.

46. A system providing for long-term archival of digital information, said digital information comprising any of digital data, programs or I/O device representations, as per claim 39, wherein said I/O device representations are any of: printers, sequential tapes, RAM, sequential character input or output, or x/y positioning.

47. A system providing for long-term archival of digital information, said digital information comprising any of digital data, programs or I/O device representations, as per claim 39, wherein said universal virtual computer code representing said printers comprises a format:
   (l,w,pixels)
where:
   l represents the number of pixel lines per page;
   w represents the number of pixels per line, and
   is a bit stream of l times w pixels.

48. A system providing for long-term archival of digital information, said digital information comprising any of digital data, programs or I/O device representations, as per claim 39, wherein said system is implemented across networks or existing communication mediums comprising any of: LANs, WANs, cellular, Internet or Web(WWW) based networks.

* * * * *